T. R. MORGAN.
Feeding Apparatus for Punching-Machines.
No. 213,770. Patented April 1, 1879.
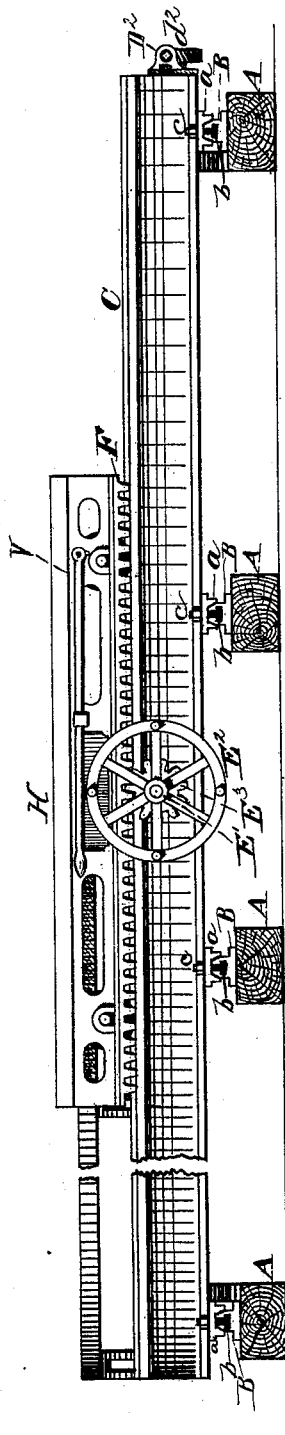
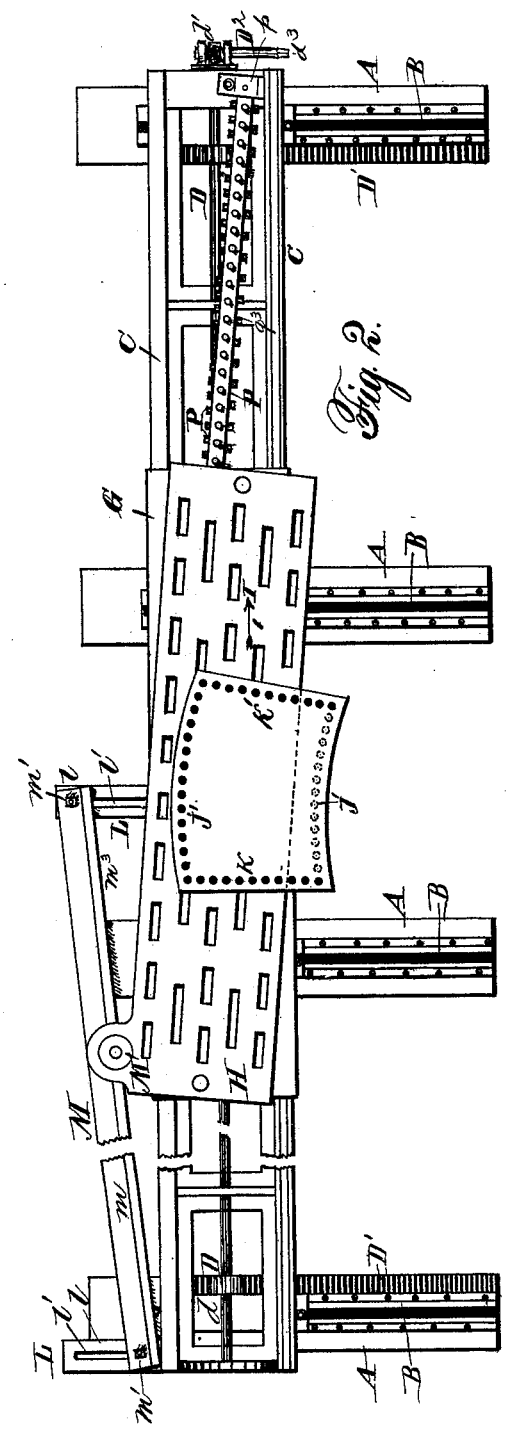

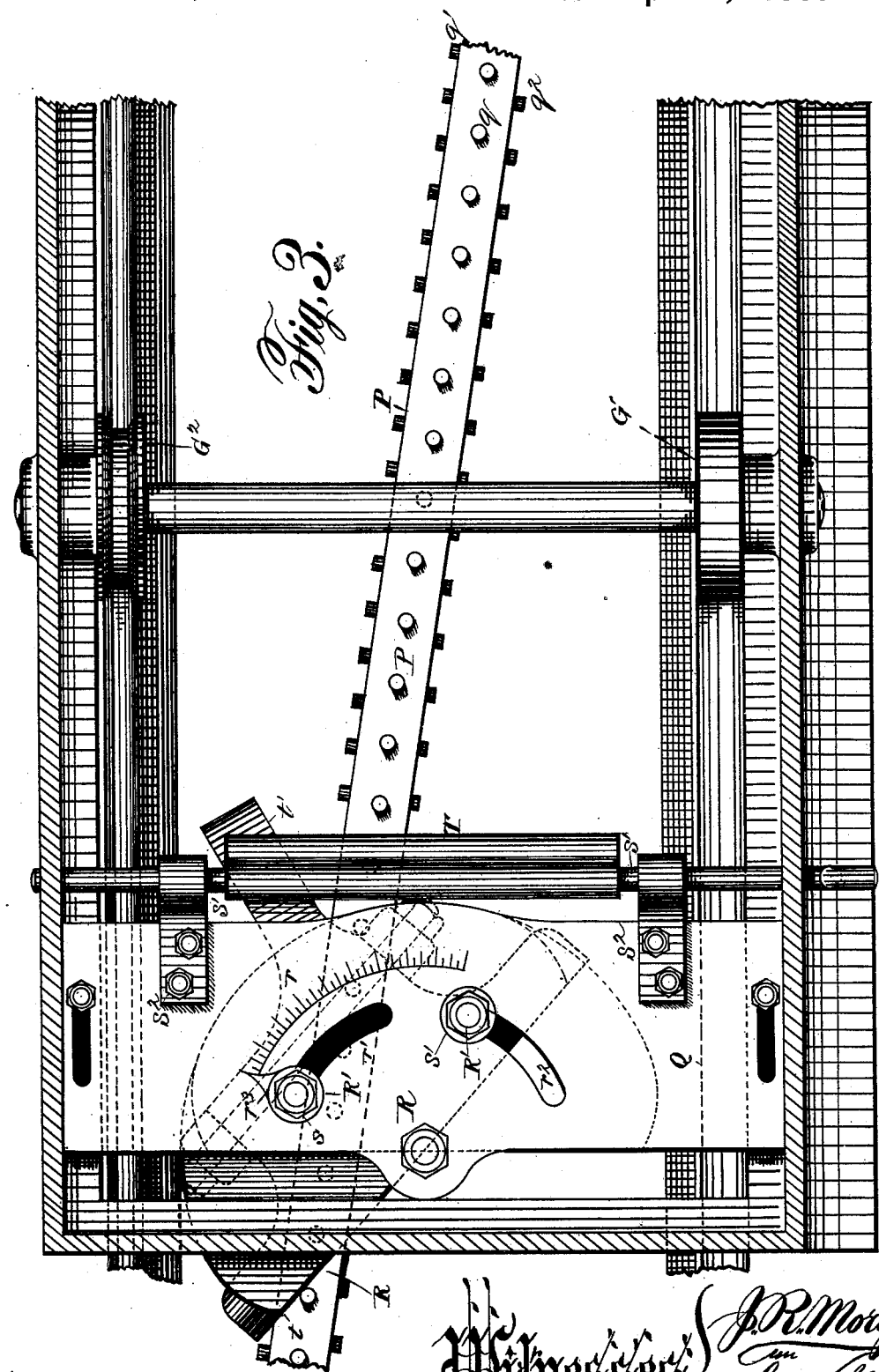

5 Sheets—Sheet 3.
T. R. MORGAN.
Feeding Apparatus for Punching-Machines.
No. 213,770. Patented April 1, 1879.
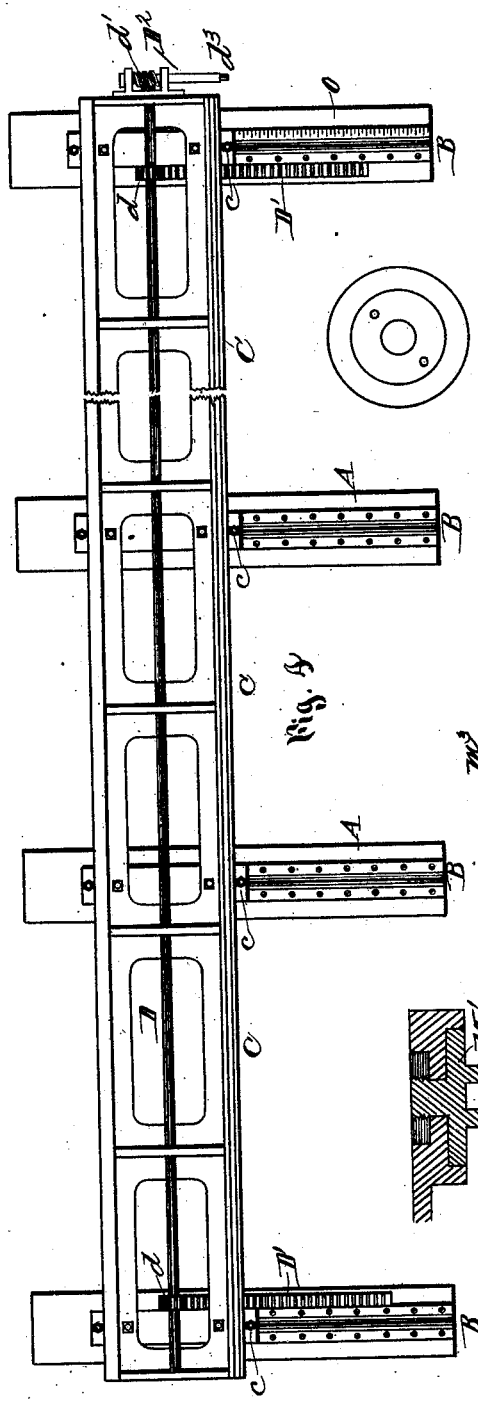
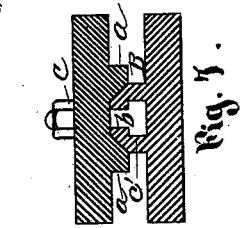
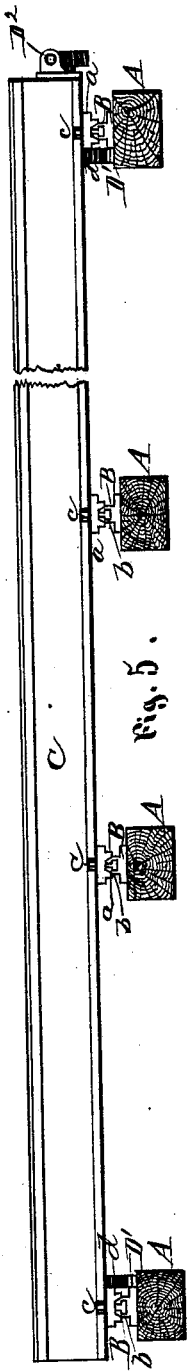
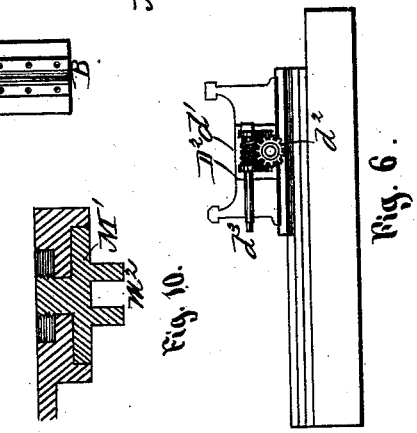

T. R. MORGAN.
Feeding Apparatus for Punching-Machines.
No. 213,770. Patented April 1, 1879.

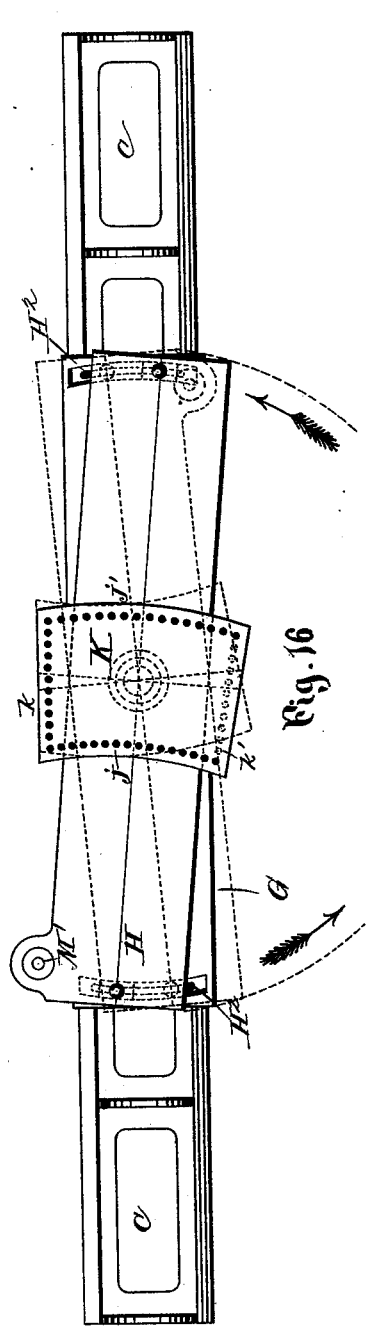
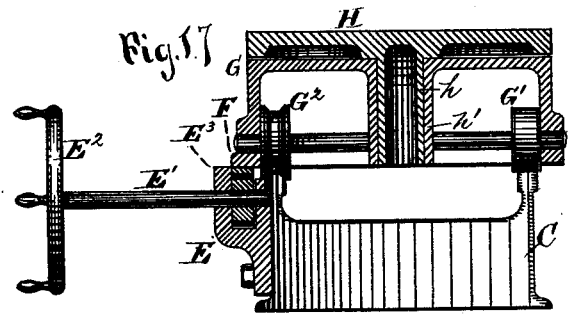
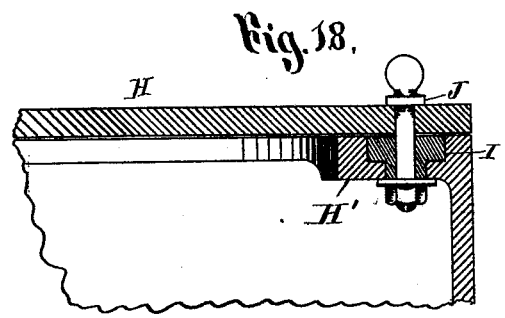
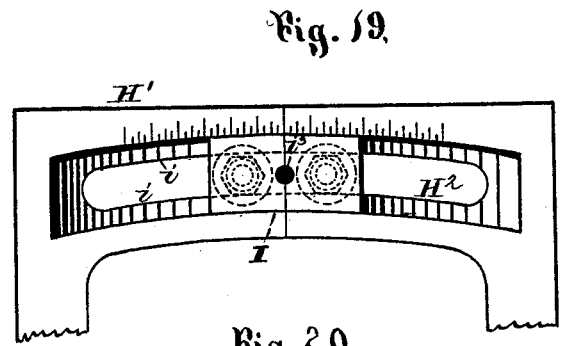
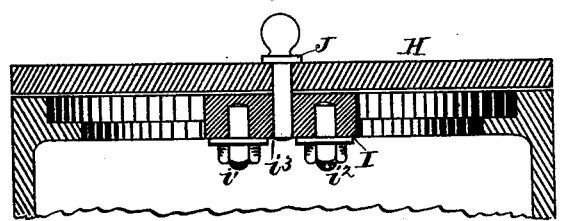

UNITED STATES PATENT OFFICE.

THOMAS R. MORGAN, OF ALLIANCE, OHIO.

IMPROVEMENT IN FEEDING APPARATUS FOR PUNCHING-MACHINES.

Specification forming part of Letters Patent No. 213,770, dated April 1, 1879; application filed August 27, 1878.

*To all whom it may concern:*

Be it known that I, THOMAS R. MORGAN, of Alliance, in the county of Stark and State of Ohio, have invented certain new and useful Improvements in Feeding Apparatus for Punching-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in feeding apparatus for punching-machines, the object being to provide a feeding apparatus of such construction that very narrow as well as wide plates of metal may be fed to the punching-machines, either in a direct line, at right angles, or at any angle of inclination to the punching-machine, and also that the plates may be fed to the punching-machine on a curve of any desired radius.

Figure 15:
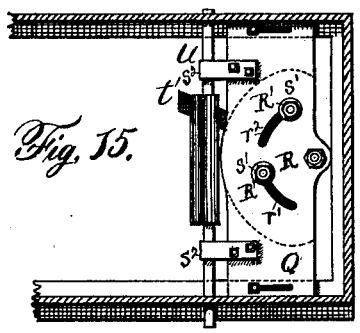
Figure 14:
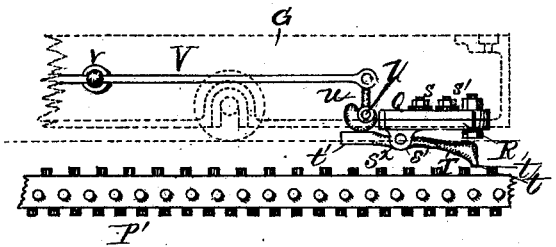
Figure 11:
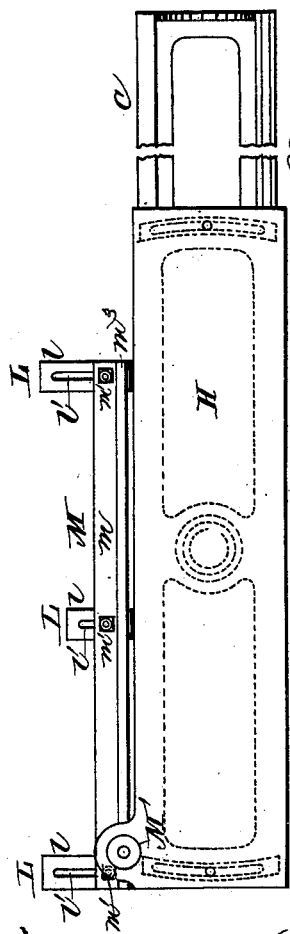
Figure 12:
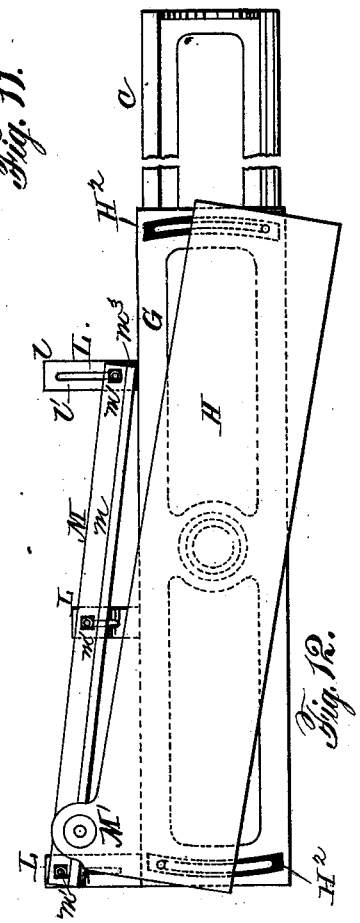
Figure 13:
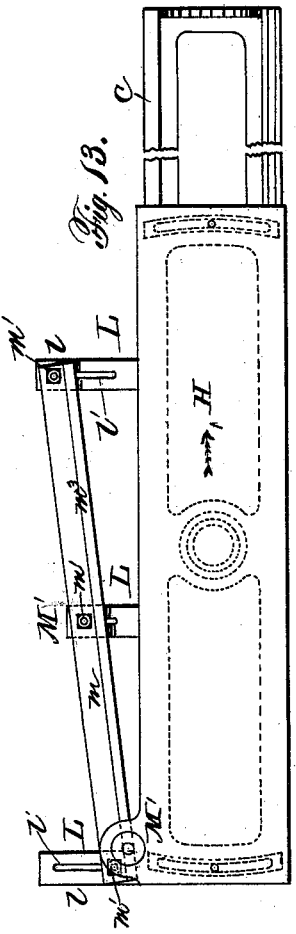

In the accompanying drawings, Figure 1 is a side elevation of my improved feeding apparatus. Fig. 2 is a plan view of the same. Fig. 3 represents an enlarged plan view of the carriage, with its table removed. Fig. 4 is a plan view of the feed-carriage-track frame. Fig. 5 is a side elevation of the frame. Fig. 6 is an end view of the frame and mechanism for imparting a lateral adjustment thereto. Fig. 7 is a cross-section of one of the grooved trackways for the frame. Figs. 8 and 10 are plan and sectional views of the slotted guide which is attached to the table and travels on the guide-rail. Fig. 9 is a transverse section of the guide-rail. Figs. 11, 12, and 13 represent plan views of the carriage and guide-rail in different adjustments. Fig. 14 is a detached view, illustrating the pawl and rack in side elevation. Fig. 15 is a plan view of the pawl-adjusting mechanism. Fig. 16 is a plan view of the table, illustrating the manner of varying its relative position with the carriage. Fig. 17 is a transverse vertical section through the center of the table and carriage. Fig. 18 is a longitudinal vertical section through a portion of one end of the table and carriage, showing the adjusting-pin. Fig. 19 is a plan view of one end of the carriage, with the table removed. Fig. 20 is a vertical transverse section of one end of the carriage and table.

A represents sills, upon which are secured the guides B. C represents the carriage-track frame, and is supported by the bearing-plates $a$, which rest upon the guides B. Through the bearing-plates $a$ extend the shanks $b$ of the T-bolts $c$, which fit within the groove $c'$ in the guides B, and thus prevent any vertical or lateral displacement of the frame C.

D is a shaft extending the entire length of frame C, and provided at its opposite ends with pinions $d$, which engage with the racks $D^1$, attached to the sills A. Shaft D may be turned by a worm-shaft, $D^2$, provided with a worm, $d^1$, which latter engages a spur-wheel, $d^2$, on the end of the shaft. By applying a crank to the squared end $d^3$ of the worm-shaft, the frame C may be readily adjusted to or from the punching-machine.

E, Fig. 17, is a bracket attached to the side of frame C, which serves as a bearing for the outer end of shaft $E^1$, the inner end of the same being supported within the frame C. Shaft $E^1$ has a hand-wheel, $E^2$, secured to its outer end, and a pinion, $E^3$, between the bracket and frame, said pinion meshing with the teeth of rack-bar F, attached to the carriage G, whereby the carriage is moved back and forth on the frame by turning the shaft $E^1$. The bracket E may project above the rack-bar F on the carriage, and may have an anti-friction roller journaled thereon, which projects over and bears upon the upper surface of the rack-bar and prevents any displacement of the carriage. $G^1$ and $G^2$ are smooth and flanged wheels for supporting the carriage on the upper edges of the sides of frame C.

H represents a table, provided with a central depending bearing, $h$, which fits within a corresponding bearing-socket, $h'$, formed in the center of the carriage G. The opposite ends of the carriage are provided with transverse plates $H^1$, each of which have arc-shaped slots $H^2$ formed therein. Arc-shaped bolt-plates I are supported by the ledges $i$ in the slots $H^2$, and may be adjustably secured in any desired position by means of the bolts and nuts $i^1$ $i^2$. Bolt-plates I are each provided with an opening, $i^3$, for the reception of adjusting-bolts J, which extend through the pivoted and axially-adjustable table mounted on the carriage.

By reference to Fig. 16 the purpose of the axial adjustment of the table will be made clear.

K represents a boiler-plate; and in order to punch the straight rows of holes $k\ k'$, it is necessary that the table, to which the plate K is secured in any desired manner, should be turned more than half-way around, in order to punch both rows of holes $k\ k'$ without readjusting the plate K on the table. To accomplish this object without removing the boiler-plate from the table, the plate is first secured to the table in a central manner. As the rows of holes $k\ k'$ are not to be formed parallel with each other, the table is first turned around until one of the straight edges of the plate is in proper position, and the bolt-plates I are then so adjusted in their arc-shaped slots that the bolt-openings $i^3$ will register with the bolts J when the table is turned to the desired point. The bolts J are then inserted and the table firmly secured in place. After a row of holes has been formed in one edge of the plate the bolts J are removed and the table turned half-way around and again secured, and the opposite row of holes punched in the plate. The rows of holes on opposite edges of the plates may be formed parallel with or at any desired angle to each other.

The opposite sides of the boiler-plate section have rows of holes $j\ j'$ formed therein on curved lines of different radii.

The following means are employed to feed the work to the punching-machine on any curve desired: To the side of the frame C are secured two or more brackets, L, the upper ends of which are formed with horizontal flanges $l$, which are provided with elongated slots $l'$. M is a guide-rail, the base $m$ of which is secured to brackets L by screws or set-nuts $m^1$. The guide-rail may be secured, at any desired angle, to frame C by loosening the set-screws $m^1$ and shifting the same in the elongated slots $l'$ until the rail is in proper position, when the screws are tightened, and the guide-rail secured at the desired angle of adjustment.

The centrally-pivoted table has a guide-block, M', loosely journaled in one corner of the same, said block having a slot, $m^2$, formed therein, which fits the vertical flange $m^3$ of the guide-rail. Now, when the shortest row of holes, $j$, is to be punched on the concave side of the plate, the end of the guide-rail nearest the center of the machine is moved away from frame C and the opposite end toward the frame, as clearly shown in Figs. 2 and 13. As the carriage is moved in the direction of the arrow 1 the holes $j$ will be formed on a concave line. To punch the holes $j'$ on the opposite or convex side of the plate, the latter is shifted on the table to bring the unpunched side beneath the punch; the carriage is then moved to the end of the frame or bed C, and the guide-rail adjusted to the position shown in Fig. 12.

Instead of shifting the section of boiler-plate to punch the rows of holes on the concave and convex sides of the sheet, the opposite diagonal corners of the table may each be provided with a slotted guide-block, so that by giving the table a half-turn one of the guide-blocks will be carried into proper position for engagement with the guide-rail. This form of construction and arrangement of parts will obviate the necessity for shifting the plates.

Heretofore feeding-machines of this class have been provided with a guide for the same purpose as that heretofore described; but the arrangement and location of the guide was radically different from that embodied in my improved machine. Ordinarily, guides have been located between the sides of the frame on which the carriage travels; but such an arrangement is objectionable, for the reason that the adjustment of the guide is not so easily effected, and for another and most important reason, namely, that in order to secure a sufficient latitude of adjustment for the various sizes of tank and boiler plates the side frames must be located so far distant that the center of the carriage is too far removed from the punch.

It will be observed that it is necessary to attach the work so that its center shall register with the center of the revolving carriage.

In order to punch holes in narrow boiler-plates, which are sometimes only twenty-four inches in width, the center of the carriage must be brought within twelve inches of the punch; and to secure this adjustment of the carriage, it is necessary to make the frame on which the carriage travels as narrow as possible, that its transverse center may be moved in close proximity to the punching-machine. By locating the guide-rail on the outside of the frame, and causing the carriage to travel in right lines, while the line of travel of the table may be varied according to the work to be performed, I secure an essential and important result for practical and varied work—viz., the machine may be readily adjusted for punching holes in plates of any desired width.

When it is desired to punch holes in wide plates, the frame C may be moved away from the punching-machine any desired distance; and in order to determine the exact adjustment without loss of time, a graduated plate, O, is attached to one of the transverse sills, by means of which the distance of the frame from the center of the punch may be readily determined, and the parts adjusted as desired.

Having described the construction of parts necessary to punch curved and straight rows of holes, I will now describe the mechanism employed for regulating the distance between the holes of each row.

P is a dividing-bar, located between the sides of frame C, and arranged obliquely to its length, the inner end of the bar being journaled in a bearing at the longitudinal center of frame C, and on one side thereof, while the outer end is journaled in a bearing located at one end of the frame, and close to the opposite side of the frame. Dividing-bar P is provided with any desired number of rows of teeth, and by rotating the bar any desired row of teeth can be brought into use. In the present instance I have illustrated the bar as being provided with four rows of teeth, $q\ q^1, q^2\ q^3$.

The distance between the teeth in row $q$ is greater than in any of the other rows, while the distance between the teeth of the different rows is gradually lessened, the row designated by the letter $q^3$ having its teeth closer to each other than either of the other rows.

The carriage G of the machine has a transverse plate, Q, secured to its opposite sides, near one of its ends, and to the under side of said plate is pivoted a pawl-carrying plate, R. Plate Q is preferably provided with an arch-shaped graduated index, $r$, formed concentric to one or both the arc-shaped slots $r^1\ r^2$ formed in the plate Q.

R' are bolts which extend through the arc-shaped slots $r^1$, and connect with the plate R. One of the bolts is provided with a pointer, $r^3$. By loosening the nuts $s\ s^1$ the plate R may be turned on its pivot to any desired angle, and secured in position by tightening the nuts again. Plate R is provided with lugs $s^2$, which serve as bearings for the journal $s^1$ of the pawl F. The engaging-edge $t$ of the pawl is of sufficient length to engage with the diagonal dividing-bar throughout its length. The opposite end of the pawl is provided with a tail-piece, $t'$. The edge $t$ of the pawl falls by gravity, and engages with the teeth on the dividing-bar.

The following means are employed to manipulate the pawl and disengage the same from the teeth on the dividing-bar: U is a rock-shaft, having its ends journaled in the sides of the carriage. To rock-shaft U is secured a curved plate or arm of sufficient width to remain in engagement with the tail of the pawl through any degree of lateral adjustment. An arm, $u$, is attached to one end of rock-shaft U, and to one end of said arm is secured one end of a rod, V, the opposite end being supported in a bearing, $v$, attached to the side of the carriage. By pulling the rod V outwardly the pawl is allowed to drop and engage a tooth on the dividing-bar, and by forcing the rod in the opposite direction the arm attached to the rock-shaft raises the engaging-edge of the pawl from the teeth on the dividing-bar and allows the carriage to be moved any desired distance. The distance between the holes on the overlapping edge of the plate must slightly exceed the distance between the holes on the edge that is overlapped, in order that the holes will register perfectly when the rivets are to be inserted.

For the production of perfect work by a feeding-machine, it is necessary to provide means for regulating the exact distance between the holes with the greatest nicety and utmost certainty, and by means of the mechanism hereinbefore described the parts may be adjusted so that the holes will be formed at any required distance apart. Assume that the teeth constituting the row $q$ on the dividing-bar are placed two inches apart from each other. By adjusting the pawl at right angles to the dividing-bar, it is evident that the carriage will be moved two inches for every adjustment of the pawl, and thus the holes may be punched in the sheet exactly two inches apart from each other.

If, now, it is desired to punch the holes at distances of four inches apart, the pawl is manipulated to skip every alternate tooth on the dividing-bar. Detachable blocks may be placed between the teeth, and thus cause the pawl to ride over every alternate tooth.

When it is desired to form the holes at a less distance apart than two inches, or the space between the ratchet-teeth of row $q$, the pawl is adjusted obliquely to the dividing-bar, and hence its travel between the teeth limited according to its angle of adjustment.

When it is impossible to secure the desired adjustment by means of the row of teeth $q^1$, the dividing-bar is given a part rotation, and the row of teeth $q^1$ brought in line with the pawl, and hence by the employment of the different rows of teeth $q$, $q^1$, $q^2$, and $q^3$ an extensive range of adjustment is secured. As heretofore stated, any desired number of rows of teeth may be provided, so that the feeding-machine shall be adapted to regulate the feed in such a manner that the holes may be punched at any distance apart desired.

A feeding-machine constructed in accordance with my invention is of comparatively few parts, and is durable in use. It possesses a great range of adjustability, so that very wide or narrow plates may be punched, either in straight or curved lines, without the necessity of removing the plate being operated upon from the table.

Again, the dividing mechanism is so located and arranged that it occupies but little space, while it enables the holes to be punched at any distance apart, either on a straight or curved line.

It is evident that slight changes might be made in the construction and arrangement of the several parts of the machine without departing from the spirit of my invention, and hence I do not limit myself to the exact construction and arrangement shown and described; but, Having fully described my invention, what I claim as new, and desire to secure by Letters Patent, is—

1. The combination, with the frame of a feeding apparatus for punching-machines, said frame provided with a laterally-adjustable guide-rail, which is located on the outer side of the frame, of a carriage adapted to travel on said frame, and a table centrally pivoted to said carriage, and connected directly with the laterally-adjustable guide-rail by a slotted guide block or stud loosely journaled in one corner of said table, substantially as set forth.

2. The combination, with brackets provided with elongated slots, said brackets secured to the outer side of frame C, a guide-rail attached to said brackets and adapted to be moved bodily toward or from the frame or adjusted at any desired angle thereto, of a carriage adapted to travel on frame C, a table centrally pivoted to the carriage, and a slotted guide block or stud loosely journaled in the table and attached to the guide-rail, substantially as set forth.

3. The combination, with the carriage of a feeding apparatus for punching-machines, and a pawl pivoted to a radially-adjustable support attached to the carriage, of a rotary dividing-bar provided with two or more rows of teeth, the teeth of each row being arranged at different distances apart from each other, said dividing-bar journaled within and arranged obliquely to the frame that supports the carriage, substantially as set forth.

4. The combination, with the carriage of a feeding-machine, of a centrally-pivoted table, and bolt-plates adapted to be adjustably secured in arc-shaped slots in the ends of the table, whereby the table may be axially adjusted and secured in any desired position by means of removable bolts or pins, substantially as set forth.

5. The combination, with a laterally-adjustable frame, C, and a carriage adapted to be moved to and fro thereon, of a table centrally pivoted upon said carriage, a laterally-adjustable guide rail located at one side of the table and on the outer side of frame C, and a slotted guide-block or stud loosely journaled in one corner of the table and connected with the laterally-adjustable guide-rail, substantially as set forth.

In testimony that I claim the foregoing I have hereunto set my hand.

THOMAS R. MORGAN.

Witnesses:
S. V. ESSICK,
J. R. MORGAN.